(12) United States Patent
van Weperen et al.

(10) Patent No.: US 6,703,118 B2
(45) Date of Patent: Mar. 9, 2004

(54) PRINTING FORM FOR ROTARY SCREEN PRINTING MADE FROM FIBER-REINFORCED PLASTICS MATERIAL

(75) Inventors: Karst Jan van Weperen, Uden (NL); Norbertus Franciscus Jacobus Elemans, Westerbeek (NL); Thomas Maria Jonkers, Boxmeer (NL)

(73) Assignee: Stork Screens B.V., Boxmeer (NL)

( * ) Notice: Subject to any disclaimer, the term of this patent is extended or adjusted under 35 U.S.C. 154(b) by 0 days.

(21) Appl. No.: 10/117,911

(22) Filed: Apr. 8, 2002

(65) Prior Publication Data

US 2003/0054143 A1 Mar. 20, 2003

Related U.S. Application Data

(63) Continuation of application No. PCT/NL00/00746, filed on Oct. 17, 2000.

(30) Foreign Application Priority Data

Oct. 18, 1999 (NL) .............................................. 1013327
Dec. 2, 1999 (NL) .............................................. 1013726

(51) Int. Cl.⁷ ............................................. B32B 25/02
(52) U.S. Cl. ................. 428/295.4; 425/298.1; 425/313.3; 425/332; 425/34.1; 425/903; 425/220; 425/319.7
(58) Field of Search ........................... 428/314.2, 317.9, 428/319.7, 215, 903, 913, 295.4, 298.1, 313.3, 332, 34.1

(56) References Cited

U.S. PATENT DOCUMENTS

| | | | | |
|---|---|---|---|---|
| 3,557,690 A | * | 1/1971 | Voeglin | 101/120 |
| 3,642,013 A | * | 2/1972 | Thierstein | 134/113 |
| 3,981,237 A | * | 9/1976 | Rodes | 101/128.2 |
| 4,959,260 A | * | 9/1990 | Tomoyasu et al. | 428/255 |
| 5,848,606 A | * | 12/1998 | Zimmer et al. | 137/561 A |
| 5,908,687 A | * | 6/1999 | Mori | 428/215 |
| 6,196,126 B1 | * | 3/2001 | Smith et al. | 101/114 |

* cited by examiner

*Primary Examiner*—Merrick Dixon
(74) *Attorney, Agent, or Firm*—Hoffman & Baron, LLP

(57) ABSTRACT

A printing form for rotary screen printing is provided and includes a thin-walled hollow cylinder made from fiber-reinforced plastics material, the cylinder wall of which is provided with continuous printing openings which define an image which is to be printed. The cylinder includes at least one layer having fibers with at least one oriented direction of the fibers. Multi-layer laminates made from carbon/epoxy having at least one layer with an oriented direction of the fibers which is parallel to the longitudinal axis of printing form are preferred.

20 Claims, 2 Drawing Sheets

PRINTING FORM FOR ROTARY SCREEN PRINTING MADE FROM FIBER-REINFORCED PLASTICS MATERIAL

CROSS-REFERENCE TO RELATED APPLICATION

This is a continuation application of PCT/NL00/00746 filed Oct. 17, 2000, which PCT application claims priority of Dutch patent application number 1013327 filed Oct. 18, 1999 and of Dutch application number 1013726 filed Dec. 02, 1999, herein incorporated by reference.

FIELD OF THE INVENTION

The present invention relates to a printing form for rotary screen printing, comprising a thin-walled hollow cylinder made from fibre-reinforced plastics material, the cylinder wall of which is provided with continuous printing openings which define an image which is to be printed.

BACKGROUND OF THE INVENTION

A printing form of this nature is described, for example, in NL-A-8802144. The cylinder used in this printing form is made from plastics material, to which solid particles and/or fibres may be added in order to increase the mechanical stability and strength. The wall of the cylinder is provided with a large number of small perforations which are in the form of a grid of dots, i.e., printing openings, which define the image which is to be printed. The printing openings may be made with the aid of a laser.

U.S. Pat. No. 3,981,237 has likewise disclosed a printing form made from plastics for rotary screen printing, the cylinder wall of which may comprise one or more layers. This patent states that, by suitably selecting the plastics material, such as polyester, it is possible to obtain the mechanical properties which are demanded for use as a printing form. In this known printing form, the printing openings may likewise be made with the aid of a laser. The plastics material may be filled with a reinforcing material such as glass fibres. Such a rotary printing screen is manufactured from a tubular blank made by conventional extrusion methods, which is stretched biaxially afterwards. These filler materials are (short) chopped fibres, which are distributed randomly in the plastics material, even after biaxially stretching. Accordingly the volume concentration of the fibres is 40% at maximum. However, the strength and rigidity of a screen thus manufactured leaves much to be desired.

The abovementioned printing forms made from plastics material, in which printing openings which define the printed image are provided, are also known in the art as plastics "galvano", even though there is actually no electrodeposition of metals involved in the production of these printing forms.

U.S. Pat. No. 4,959,260 discloses a mesh fabric useful for manufacturing a flat printing screen and consisting essentially of conjugate filaments. Each of the conjugate filaments has a sheath made from a material having a high adhesive property to an emulsion and resin used for preparing a stencil from a screen, and a core made from a material having high dimensional stability and elastic recovery property. Furthermore the mesh fabric should meet well defined mechanical requirements. In such a fabric or a screen produced therefrom no plastics matrix is present, wherein the filaments are incorporated.

Nickel stencils for rotary screen printing are difficult to handle and are fragile, in particular if the stencil (still) contains printing paste. The thickness of the nickel stencils, which is of decisive importance for the rigidity, is limited by the size of holes required and the mesh number, and can only be increased to a limited extent using the standard electroforming techniques. In the case of plastics materials in which perforations can be made with the aid of high-energy radiation, it is in principle possible to make more robust printing forms, which are therefore easier to handle.

However, these known printing forms made from plastics have not attained commercial success. One of the possible reasons for this is the low rigidity of plastics in general. Plastics are less rigid than nickel, which is the preferred material for conventional screen-printing forms, by a factor of approximately 100. A nickel stencil has a modulus of elasticity E of approximately 90 GPa; a cylinder provided with perforations which is made from polyester, which is one of the more rigid plastics, has a modulus of elasticity E of approximately 2 GPa. The elastic deformations which occur, inter alia, when the printing form is used for rotary screen printing, are dependent on the modulus of elasticity and also on the wall thickness of the cylinder. A PET galvano must have a thickness of approximately 0.89 mm in order to attain the same level of rigidity as a nickel stencil with a thickness of 0.1 mm. A large wall thickness of this nature has an adverse effect on the printing properties and the possibility of making printing openings with the aid of a laser. In addition, thick-walled printing forms of this nature are less easy or even altogether impossible to push together for transport and/or storage, as is customary with the thin-walled metal screen-printing forms, which can be transported and stored pushed together in the shape of a kidney. Furthermore, it is known that under load plastics are deformed more readily as a result of creep than metals, such as nickel.

As has been already been suggested above in accordance with NL-A-8802144, plastics can generally be made more rigid by the addition of fillers and/or fibres. However, this Dutch patent application does not provide any insight into how the intended increase in mechanical stability can be achieved.

The object of the present invention is to provide a printing form for rotary screen printing made from fibre-reinforced plastics material, in which the wall thickness of the cylinder is such that the printing properties and the possibility of making printing openings with the aid of a laser, as well as the possibility of transporting and/or storing the forms pushed together, are not adversely affected, or are scarcely adversely affected.

Another object of the invention is to provide a printing form for rotary screen printing made from fibre-reinforced plastics material, the mechanical properties of which are improved compared to the printing form made from (fibre-reinforced) plastics material described in the prior art.

SUMMARY OF THE INVENTION

According to the invention, the printing form for rotary screen printing of the type described above is characterized in that the cylinder comprises at least one layer having fibres with at least one oriented direction of the fibres. A single plastics layer with fibres incorporated therein which are oriented in one direction (also referred to below as unidirectional fibres) has anisotropic elastic properties, i.e., the properties are dependent on the direction in which the load is acting.

The addition of fibres to plastics generally imparts an improved rigidity. Fibres may be added in the form of so-called short fibres (also known as "chopped fibres"), as long fibres which are arbitrarily distributed in the plastics material, and as unidirectional fibres. The use of unidirectional fibres in principle provides the highest rigidity which can be achieved. Furthermore, the highest fibre content can be achieved with layers having unidirectional fibres, and consequently it is with these fibres that the highest modulus of elasticity can be attained.

As has already been stated, a single plastics layer having unidirectional fibres has anisotropic elastic properties. According to the invention, this anisotropy is used to limit the deformation in the direction of the load.

In this specification a fibre-reinforced plastics material is meant to be a plastics matrix layer, wherein reinforcing fibres are incorporated. According to the invention these fibres are oriented in one direction.

In addition to the customary use of the printing form according to the invention for rotary screen printing, in which printing ink or printing paste is applied to a substrate which is to be printed through the continuous printing openings, the printing form is also suitable for applying other coating materials to a substrate of this nature. One example of a coating material of this nature is a hot-melt adhesive. In other words, the expression "for rotary screen printing" is not restricted to using printing ink or printing paste to print a substrate, but rather, in a broad sense, comprises the application of a material to a substrate through the continuous openings while the printing form is rotating. The printing screen according to the invention may be a conventional screen from which a stencil is prepared using standard photoresist techniques, so that only those openings in the screen remain open, which define the image to be printed, the so called "continuous printing openings", while the other openings in the screen are covered and/or filled by the cured portions of the photoresist. The printing screen according to the invention is preferably a galvano, comprising only continuous printing openings, which may have been made by a laser.

The invention also relates to a rotary screen-printing device provided with a printing form according to the invention.

BRIEF DESCRIPTION OF THE DRAWINGS

The invention is explained below with reference to the appended drawing in which.

DESCRIPTION OF THE PREFERRED EMBODIMENTS

Figure 1:
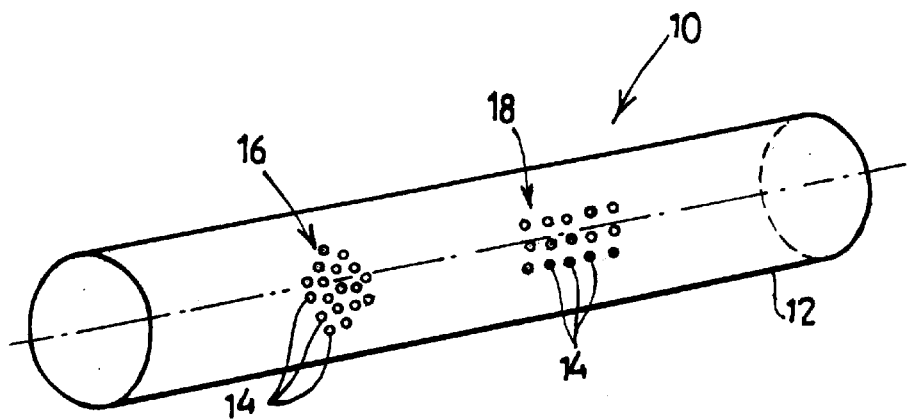
FIG. 1 shows a perspective, diagrammatic view of a rotary screen-printing form.

During operation, a plurality of loads act on a printing form simultaneously but in different directions. According to one embodiment, the printing form according to the invention therefore comprises a fibre-reinforced layer having fibres with two differently oriented directions of the fibres, such as a woven or braided fabric of fibres, a fibre mat or a fibre cloth.

To reduce the total amount of bending, it is preferable for one oriented direction of the fibres to run parallel to the longitudinal axis of the printing form, i.e., in the axial direction.

According to another embodiment of the printing form according to the invention, the cylinder comprises a first layer having fibres in a first oriented direction of the fibres, and a second layer having fibres in a second oriented direction of the fibres, with the first and second directions of the fibres not being identical. As has already been stated, the separate layers having unidirectional fibres may have a high fibre content (compare a fibre content of 63% by volume for a unidirectional carbon fibre in epoxy resin with a fibre content of approximately 35% by volume for a nonwoven in epoxy resin), which is of benefit to the elastic properties. A cylinder of this type for the printing form according to the invention is composed of at least two layers of fibre-reinforced plastic, of which the fibres in a layer are oriented in one direction and the directions of the fibres do not run parallel to one another.

Preferably, the oriented direction of the fibres of the first layer forms an angle $\alpha$ with the longitudinal axis of the printing form, and the oriented direction of the fibres of the second layer forms an angle $-\alpha$ with the longitudinal axis of the printing form. The cylinder advantageously also comprises a further layer having fibres in a third oriented direction of the fibres, the direction of the fibres of which further layer runs parallel to the longitudinal axis of the printing form. More preferably, the further layer is arranged between the first and second layers.

Examples of the angle $\alpha$ are 45° and angles >60°. A 3-layer laminate for use in the printing form according to the invention therefore comprises 3 layers with differently oriented directions of the fibres of, for example, 0° and ±60° or 0° and ±45° or 0° and 90° (×2) with respect to the longitudinal axis of the printing form.

According to another embodiment of the printing form according to the invention, the first layers with a first oriented direction of the fibres and the second layers with a second oriented direction of the fibres alternate with one another. One example of an embodiment of this nature is a printing form which is made from a 4-layer laminate, with the oriented direction of the fibres of the first and third layers and of the second and fourth layers being identical.

According to a particularly preferred embodiment, the cylinder is of symmetrical structure in the thickness direction, and the oriented direction of the fibres of outermost, first layers forms an angle $\alpha$ with the longitudinal axis of the printing form, and the oriented direction of the fibres of second, intermediate layers forms an angle $-\alpha$ with the longitudinal axis of the printing form. In this embodiment too, the cylinder advantageously comprises a further layer having fibres in a third oriented direction of the fibres, which direction of the fibres runs parallel to the longitudinal axis of the printing form. Just as in the cylinder comprising 3 layers which has been discussed above, the further layer is preferably arranged between the second, intermediate layers, i.e., in the centre as seen in the thickness direction of the cylinder wall.

In the multilayer laminates described above, which are used to make the printing form according to the invention and which comprise a further layer having fibres in an oriented direction of the fibres which is parallel to the longitudinal axis of the printing form, the thickness of this further layer is advantageously greater than the thickness of the other layers. In this case, the other layers with an identically oriented direction of the fibres generally have an identical layer thickness. Depending on the thickness (diameter) of the fibres and the desired final thickness of the cylinder of the printing form according to the invention, this printing form may also comprise a plurality of adjacent layers having the same direction of the fibres.

The presence of at least one layer having unidirectional fibres with at least one oriented direction of the fibres or a combination of layers of this nature in the printing form according to the invention allows a low total wall thickness to be maintained, preferably in the range from 80–300 micrometers, so that the printing properties are good. A small thickness of this nature also allows the printing openings to be made using a laser, in accordance with a design which is to be printed. In addition, the printing forms can be bent into the kidney shape which is suitable for transport and can therefore be pushed together.

The mechanical properties of the printing form according to the invention are also good, as will be apparent from the following more detailed consideration of the load which acts on a screen-printing form during printing.

In rotary screen printing, it is customary for a printing form—galvano or stencil—to be clamped on a printing machine above a printing belt. A printing belt of this nature is an endless belt to which the substrate to be printed is temporarily attached. The printing belt is supported by means of a counter roller at each printing position in the printing machine. In the printing form there is a squeegee which supplies the printing paste and presses it through the printing openings in the cylinder wall of the printing form on to the advancing substrate. The load to which the printing form is subjected during the printing process is caused by the contact between the printing form, on the one hand, and, on the other hand, the squeegee the printing paste and the substrate to be printed. The printing form moves past the stationary squeegee, resulting in a frictional force directed oppositely to the direction of rotation of the printing form. The shear forces of the printing paste also act in this direction. To partially compensate for these forces, the speed of the printing belt is set to be a few tenths of a per cent higher than the peripheral velocity of the printing form; in other words, the printing belt is said to have a lead over the stencil. Therefore, the substrate exerts a frictional force, which is oppositely directed to that of the squeegee, on the printing form. The resulting maximum load on the printing form, which is also known as the process force, is a uniformly distributed load in the tangential direction on the underside of the printing form at the location where the printing form is in contact with the squeegee and the substrate to be printed. The result is that an image (design) which is to be printed is applied to the substrate in a curve, i.e., curvature arises if there are differences in the deformation. The abovementioned resultant maximum load, for a nickel stencil having a thickness of 0.1 mm and with a print width of 1850 mm is approximately 0.1 N/mm. Above this load, torsional bending occurs. To prevent this bending of a printing form, an axial pre-stress of 1000 N is imparted. For longer stencils, the maximum permissible load is proportionally lower.

Curvature means that a straight line in the image to be printed appears as a curve on the substrate. Factors which contribute to this curvature include local deformation of the printing form, (pure) torsion of the printing form and (pure) bending of the printing form. Local deformation arises as a result of the fact that the printing form is only held at the two ends, by end rings. Torsion of the printing form is corrected by adoption of a skew position, likewise resulting in a curve being formed on the substrate. Of these factors, local deformation is the biggest contributor to the curvature. In the printing form according to the invention, local deformation is counteracted by the use of unidirectional fibres in one or more layers having one or more differently oriented directions of the fibres.

The oriented directions of the fibres, layer thicknesses and material can be varied, although there are preferred directions and materials, as has already been stated above and will be illustrated in more detail below.

If desired, in the printing form according to the invention, it is possible for the material layers of the cylinder to be combined to form a quasi-isotropic laminate, in order to reduce the anisotropy of a single layer having unidirectional fibres.

As has already been stated above, it is possible for the fibre materials and the plastics of the binder matrix to be selected as a function of the desired properties. Examples of suitable fibre materials include carbon fibres, inorganic fibres such as glass fibres and boron fibres, metal fibres and organic plastic fibres, such as stretched fibres, for example aramid fibres and fibres of high-strength stretched polyethylene, as well as combinations thereof. The carbon fibres and inorganic fibres are particularly preferred, and of these carbon fibres are most preferred. The binder material used is not critical, since it makes little contribution to the mechanical properties compared to the fibres, and may be selected from the known thermoplastics, such as polyesters and thermosetting plastics, such as epoxy resins. Of customary combinations, carbon/epoxy is preferred, on account of the excellent relationship between cost price and rigidity. The rigidity of this combination is virtually twice as great as that of kevlar/epoxy and three times as great as that of glass/epoxy. Other combinations with a still higher rigidity include carbon/polyimide, graphite/epoxy and silicon carbide/ceramic. However, these combinations are expensive. The above-mentioned single-layer materials are commercially available.

The elastic parameters for a number of fibre/binder matrix single-layer combinations are described, inter alia, in "Engineering Mechanics of Composite Materials", I. M. Daniel et al., Oxford University Press, 1994, and are compiled below in Table 1.

TABLE 1

| | Fibre content (% by volume) | E modulus // fibres (GPa) | E modulus ⊥ fibres (GPa) | Sliding modulus (GPa) | Poisson's ratio |
| --- | --- | --- | --- | --- | --- |
| E-glass/ Epoxy | 55 | 39 | 8.6 | 3.8 | 0.28 |
| S-glass/ Epoxy | 50 | 43 | 8.9 | 4.5 | 0.27 |
| Kevlar/ Epoxy | 60 | 87 | 5.5 | 2.2 | 0.34 |
| Carbon/ PEEK | 58 | 131 | 8.7 | 5.0 | 0.28 |
| Carbon/ Epoxy | 63 | 142 | 10.3 | 7.2 | 0.27 |
| Carbon/ Polyimide | 45 | 216 | 5.0 | 4.5 | 0.25 |
| Graphite/ Epoxy | 57 | 294 | 6.4 | 4.9 | 0.23 |
| Silicon Carbide/ Ceramic | 39 | 121 | 112 | 44 | 0.20 |

The elastic parameters for quasi-isotropic laminates are given in Table 2 below.

TABLE 2

| | E modulus (GPa) | Sliding modulus (GPa) | Poisson's ratio |
|---|---|---|---|
| E-glass/Epoxy | 18.9 | 7.3 | 0.29 |
| S-glass/Epoxy | 20.9 | 8.2 | 0.27 |
| Kevlar/Epoxy | 32.6 | 12.3 | 0.33 |
| Carbon/PEEK | 50.7 | 19.4 | 0.30 |
| Carbon/Epoxy | 56.7 | 22.1 | 0.29 |
| Carbon/Polyimide | 77.4 | 29.6 | 0.31 |
| Graphite/Epoxy | 104 | 39.7 | 0.31 |
| Silicon carbide/Ceramic | 113 | 46.4 | 0.22 |

The materials from which the layers are made may, in addition to the abovementioned binders and unidirectional fibres, also contain other conventional additives, such as lubricants, adhesion-promoting agents, fillers, pigments and the like, if desired.

Furthermore, if desired, it is possible for the printing form according to the invention to be provided with one or more additional surface layers which do not contain any fibres and have desired properties, in particular plastics layers, on the inner and/or outer side of the cylinder. Examples of desired properties of this nature include, inter alia, reduced friction, wear resistance, scratch resistance, hydrophobic properties, an increase in contrast, and strength. An increase in contrast may be advantageous in order to make the fine printing openings and the design which they form readily visible under defined viewing angles, for example by the application of a white surface layer of polyethylene to the outer circumference of a black cylinder made from epoxy resin containing carbon fibres. A surface layer of polytetrafluoroethylene, such as TEFLON, may be provided with a view to reducing friction.

In the drawing, FIG. 1 shows a rotary screen-printing form 10 which comprises a thin, hollow cylinder 12 made from fibre-reinforced plastics material. Perforations are made in this cylinder in accordance with the design to be printed using high-energy radiation, such as a $CO_2$ laser. These perforations form the printing openings 14, which define the image 16 and 18 to be printed, in the embodiment shown the full area of a circle 16 and the full area of a rectangle 18.

Figure 2:
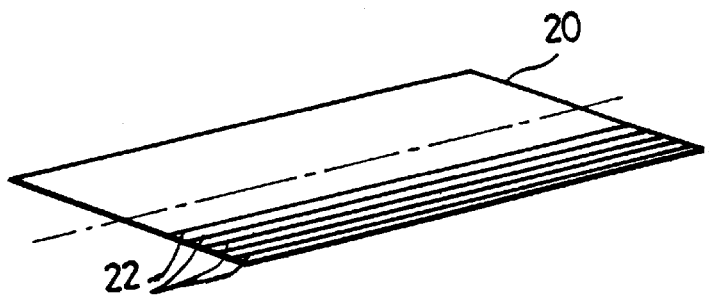
FIG. 2 shows a diagrammatic view of a fibre-reinforced plastics layer with an oriented direction of the fibres.

FIG. 2 shows a planar fibre-reinforced plastics layer 20 having fibres 22 (diagrammatically indicated by relatively thin, continuous lines), of which the oriented direction of the fibres runs parallel to the longitudinal axis of a cylinder which is to be made from this layer. This axial direction of the fibres is advantageous for reducing the total bending of the printing form 10.

For the sake of simplicity, in the following figures identical components are denoted by identical reference numerals.

Figure 3:
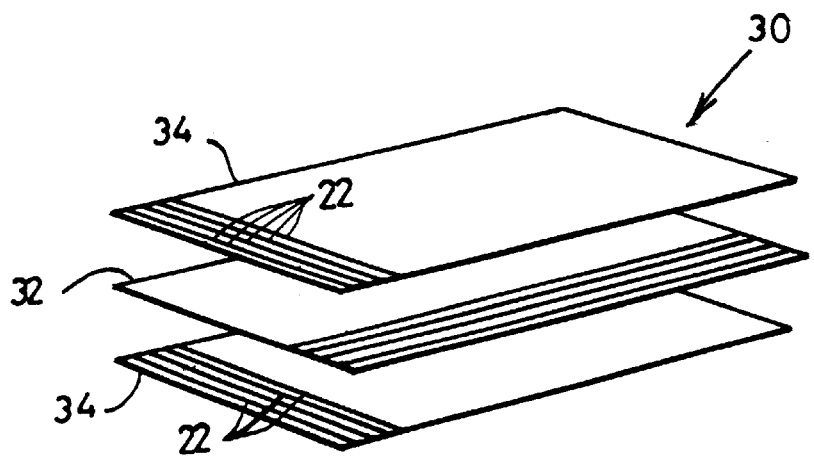
FIG. 3 shows an exploded, diagrammatic view of a symmetrical 3-layer laminate.

FIG. 3 diagrammatically depicts a 3-layer laminate 30, in which the middle layer 32 consists of the fibre-reinforced plastics layer shown in FIG. 2, i.e., the fibres 22 run parallel to the longitudinal axis (not shown in FIG. 3). On both sides of the middle layer 32 there is an outermost layer 34, the fibres 22 of which have an orientation which is perpendicular to the longitudinal axis. A laminate with unidirectional fibres of this nature may, for example, be formed by means of customary techniques, such as pultrusion, injection-moulding, lamination and winding, and may be machined, if necessary, by grinding, polishing and the like. A suitable method for preparing a tubular body is disclosed in U.S. Pat. No. 5,071,506, which body is perforated thereafter in order to provide the continuous printing openings. In this method a composite material is applied on a mandrel having an inflatable bladder. The mandrel is inserted into a single press mould. Upon pressurizing the inflatable bladder the composite material is forced against the wall of the mould. Subsequently the composite material is cured.

Figure 4:
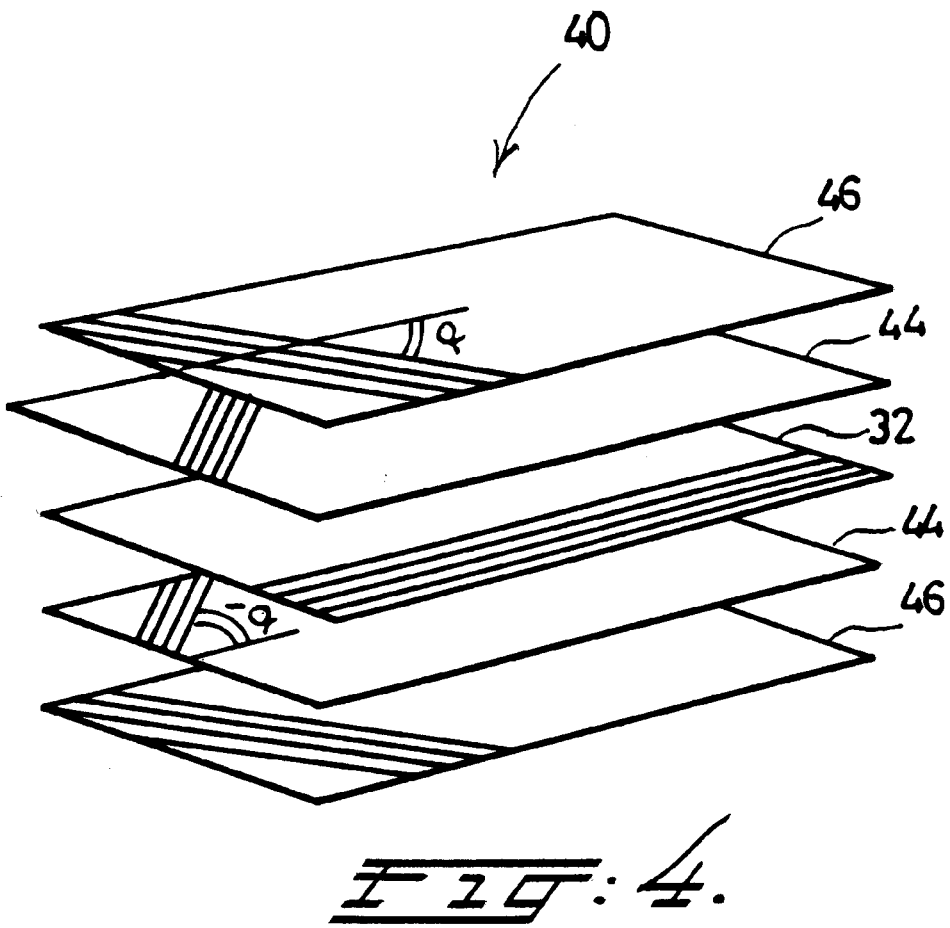
FIG. 4 shows an exploded, diagrammatic view of a 5-layer laminate.

FIG 4 shows a diagram illustrating the layer structure of an example of a 5-layer laminate 40 according to the invention in planar form. The laminate 40 with a symmetrical structure comprises a middle layer 32, in which fibres 22 are oriented in the longitudinal direction of the printing form which is to be made from this laminate. On either side of the middle layer 32 there are two intermediate layers 44, of which the direction of the fibres forms an angle α −70° with respect to the longitudinal axis. The outermost, first layers 46 have fibres 22 with an orientation of +70° with respect to the longitudinal axis.

Table 3 below shows the deformation data for carbon/epoxy laminates (Ex=142 GPa; Ey=10.3 GPa; Gxy=7.2 GPa and ν=0.27; repeat =64 cm), with variations in the layer thickness and the direction of the fibres. For comparison purposes, the deformation data of a nickel stencil and a printing form made from isotropic carbon/epoxy (E=56.7 GPa; Gxy=22.0 GPa; ν=0.286) are shown, as are deformation data for epoxy on its own (E=4 GPa) and PET (E=3 GPa). Cf. Examples 1 and 20–21. The maximum deformation (in mm) in the centre on the plane of the substrate on which the image is being printed is given for two print widths of 1620 mm and 1850 mm.

TABLE 3

| Example | Material | | | | | | Total thickness (mm) | max. deformation (mm) print width 1620 mm | Print width 1850 mm |
|---|---|---|---|---|---|---|---|---|---|
| 0 | nickel | | | | | | 0.10 | 2.50 | 3.51 |
| | | | | | | | 0.12 | 1.86 | 2.63 |
| | | | | | | | 0.14 | 1.46 | 2.06 |
| 1 | iso C | | | | | | 0.14 | 2.32 | 3.27 |
| 2 | $\alpha^1$ | 60 | −60 | iso C | −60 | 60 | | | |
| a | $d^2$ | 0.01 | 0.01 | 0.1 | 0.01 | 0.01 | 0.14 | 2.52 | 3.59 |
| 3 | α | 60 | −60 | 0 | −60 | 60 | | | |
| a | d | 0.01 | 0.01 | 0.1 | 0.01 | 0.01 | 0.14 | 1.71 | 2.36 |
| b | d | 0.02 | 0.02 | 0.06 | 0.02 | 0.02 | 0.14 | 1.91 | 2.69 |
| c | d | 0.028 | 0.028 | 0.028 | 0.028 | 0.028 | 0.14 | 2.64 | 3.77 |
| 4 | α | 60 | −30 | 0 | 30 | −60 | | | |

TABLE 3-continued

| Example | Material | | | | | | Total thickness (mm) | max. deformation (mm) print width 1620 mm | Print width 1850 mm |
|---|---|---|---|---|---|---|---|---|---|
| a | d | 0.032 | 0.032 | 0.032 | 0.032 | 0.032 | 0.16 | 1.77 | 2.50 |
| b | d | 0.028 | 0.028 | 0.028 | 0.028 | 0.028 | 0.14 | 2.19 | 3.08 |
| 5 | α | 70 | −70 | 0 | −70 | 70 | | | |
| a | d | 0.01 | 0.01 | 0.1 | 0.01 | 0.01 | 0.14 | 1.66 | 2.30 |
| b | d | 0.02 | 0.02 | 0.06 | 0.02 | 0.02 | 0.14 | 1.86 | 2.62 |
| c | d | 0.028 | 0.028 | 0.028 | 0.028 | 0.028 | 0.14 | 2.59 | 3.70 |
| 6 | α | 70 | 0 | −70 | | | | | |
| | d | 0.028 | 0.084 | 0.028 | | | 0.14 | 1.89 | 2.63 |
| 7 | α | 80 | −80 | 0 | −80 | 80 | | | |
| | d | 0.01 | 0.01 | 0.1 | 0.01 | 0.01 | 0.14 | 1.70 | 2.33 |
| 8 | α | 60 | −15 | 0 | 15 | −60 | | | |
| | d | 0.028 | 0.028 | 0.028 | 0.028 | 0.028 | 0.14 | 2.45 | 3.40 |
| 9 | α | 60 | −15 | 0 | −15 | 60 | | | |
| | d | 0.028 | 0.028 | 0.028 | 0.028 | 0.028 | 0.14 | 2.43 | 3.41 |
| 10 | α | 60 | 0 | −60 | | | | | |
| | d | 0.028 | 0.084 | 0.028 | | | 0.14 | 2.07 | 2.87 |
| 11 | α | 70 | −70 | 0 | | | | | |
| | d | 0.028 | 0.028 | 0.084 | | | 0.14 | 2.42 | 3.35 |
| 12 | α | 80 | 0 | −80 | | | | | |
| | d | 0.028 | 0.084 | 0.028 | | | 0.14 | 1.80 | 2.48 |
| 13 | α | 90 | 0 | 90 | | | | | |
| a | d | 0.01 | 0.12 | 0.01 | | | 0.14 | 1.81 | 2.46 |
| b | d | 0.02 | 0.1 | 0.02 | | | 0.14 | 1.74 | 2.37 |
| c | d | 0.028 | 0.084 | 0.028 | | | 0.14 | 1.78 | 2.45 |
| 14 | α | 90 | 0 | 30 | 90 | | | | |
| | d | 0.02 | 0.09 | 0.01 | 0.02 | | 0.14 | 1.72 | 2.36 |
| 15 | α | 60 | −60 | | | | | | |
| | d | 0.07 | 0.07 | | | | 0.14 | 6.52 | 9.37 |
| 16 | α | 60 | −60 | 60 | −60 | | | | |
| | d | 0.035 | 0.035 | 0.035 | 0.035 | | 0.14 | 5.58 | 8.06 |
| 17 | α | 0 | | | | | 0.14 | 2.73 | 3.70 |
| 18 | α | 0 | 60 | | | | | | |
| | d | 0.07 | 0.07 | | | | 0.14 | 2.82 | 3.88 |
| 19 | α | 60 | | | | | 0.14 | 6.40 | 9.13 |
| 20 | epoxy | | | | | | 0.14 | 32.2 | 45.5 |
| 21 | PET | | | | | | 0.14 | 43.0 | 60.7 |
| 22 | Carbon (63 vol %) / Epoxy | | | | | | | | |
| | α | 88 | −13 | 13 | 88 | | 0.14 | | |
| | d | 11 | 59 | 59 | 11 | | | | 2.31 |
| 23 | S-glass (63 vol %) / Epoxy | | | | | | | | |
| | α | 88 | −13 | 13 | 88 | | 0.14 | | |
| | d | 11 | 59 | 59 | 11 | | | | 5.00 |
| 24 | Chopped fibers (40 vol %; E = 20 Gpa) / Epoxy | | | | | | | | |
| | α | 88 | −13 | 13 | 88 | | 0.14 | | |
| | d | 11 | 59 | 59 | 11 | | | | 9.27 |

[1]angle (°) of direction of the fibres with respect to the longitudinal axis of the printing form.
[2]layer thickness (mm)

For a 7-layer laminate, in which each layer has a thickness of 0.028 mm (total thickness 0.169 mm), and the direction of the fibres in the successive layers is −60, 60, −30, 0, 30, −60, 60° with respect to the longitudinal axis, the maximum deformation is 1.38 and 2.00 for print widths of 1620 mm and 1850 mm, respectively. If each layer thickness is 0.032 mm (total thickness 0.224), these deformation values are 1.13 and 1.61, respectively.

It is apparent from the above examples, inter alia, that with printing forms which are made from 3-layer laminates and have a middle layer which is 0.084 mm thick with a direction of the fibres running parallel to the longitudinal axis (=0°), the maximum deformation decreases as α increases, with the layer thickness of the outermost layers remaining constant, cf. Examples 6, 10, 12 and 13c. It should be noted that in practice, the selection of a suitable direction of the fibres will partly be determined by the reproducibility of the manufacturing technique employed and the total cost. For example, it has been found that it is more difficult to produce a printing form according to the invention with one or more layers which have unidirectional fibres at an angle of 90° with respect to the longitudinal axis of the printing form by means of winding, and therefore additional costs are involved, than winding a layer of this nature with a direction of the fibres of less than 90°, for example 85°, with respect to the longitudinal axis.

The preferred position of the layer with a direction of the fibres which is parallel to the longitudinal axis can be seen by comparing Examples 6 and 11. Furthermore, the above examples clearly show the influence of the layer thicknesses (cf. for example Example 3) given constant angles and of the number of layers (cf. Examples 15 and 16, 3 and 10) on the maximum deformation.

What is claimed is:

1. Printing form for rotary screen printing, comprising a thin-walled hollow cylinder made from fibre-reinforced plastics material, the cylinder wall of which is provided with continuous printing openings which define an image which is to be printed, wherein the cylinder comprises at least one layer having fibres with at least one oriented direction of the fibres.

2. Printing form according to claim 1, wherein the cylinder comprises a fibre-reinforced layer having fibres with two oriented directions of the fibres.

3. Printing form according to claim 1, wherein an oriented fibre direction lies parallel to the longitudinal axis of the printing form.

4. Printing form according to claim 1, wherein the cylinder comprises a first layer having fibres in a first oriented direction of the fibres, and a second layer having fibres in a second oriented direction of the fibres, the oriented directions of the fibres not being identical.

5. Printing form according to claim 4, wherein the oriented direction of the fibres of the first layer forms an angle α with the longitudinal axis of the printing form, and the oriented direction of the fibres of the second layer forms an angle -α with the longitudinal axis of the printing form.

6. Printing form according to claim 4, wherein the cylinder also comprises a further layer having fibres in a third oriented direction of the fibres, the direction of the fibres running parallel to the longitudinal axis of the printing form.

7. Printing form according to claim 6, wherein the said further layer is present between the first layer and the second layer.

8. Printing form according to claim 4, wherein first layers having a first oriented direction of the fibres and second layers having a second oriented direction of the fibres alternate with one another.

9. Printing form according to claim 1, wherein the cylinder is of symmetrical structure in the thickness direction, and the oriented direction of the fibres of outermost, first layers forms an angle α with the longitudinal axis of the printing form, and the oriented direction of the fibres of second, intermediate layers forms an angle -α with the longitudinal axis of the printing form.

10. Printing form according to claim 9, wherein the cylinder comprises a further layer having fibres in a third oriented direction of the fibres, which direction of the fibres runs parallel to the longitudinal axis of the printing form.

11. Printing form according to claim 10, wherein the further layer is arranged between the second, intermediate layers.

12. Printing form according to claim 6, wherein the layer thickness of the outermost, first layers is identical.

13. Printing form according to claim 6, wherein the thickness of the further layer is greater than the thickness of the other layers.

14. Printing form according to claim 9, wherein the layer thickness of the outermost, first layers is identical.

15. Printing form according to claim 10, wherein the thickness of the further layer is greater than the thickness of the other layers.

16. Printing form according to claim 1, wherein the fibre-reinforced plastics material consists of unidirectional carbon fibres in an epoxy matrix.

17. Printing form according to claim 1, wherein the total thickness of the cylinder wall of the printing form lies in the range from 80–300 μm.

18. Printing form according to claim 1, wherein the cylinder is made from a quasi-isotropic laminate.

19. Printing form according to claim 1, wherein a surface layer which does not contain any fibres is provided on the inner side and/or outer side of the cylinder.

20. Rotary screen-printing device provided with a printing form for rotary screen printing, comprising a thin-walled hollow cylinder made from fibre-reinforced plastics material, the cylinder wall of which is provided with continuous printing openings which define an image which is to be printed, wherein the cylinder comprises at least one layer having fibres with at least one oriented direction of the fibres.

* * * * *